United States Patent [19]

Compoly et al.

[11] 3,851,322

[45] Nov. 26, 1974

[54] SHORT CIRCUIT MONITOR FOR STATIC INVERTERS AND THE LIKE

[75] Inventors: Albert William Compoly, Belmar; Alfred Charles Temple, Manasquan, both of N.J.

[73] Assignee: Avionic Instruments Inc., Rahway, N.J.

[22] Filed: Nov. 23, 1973

[21] Appl. No.: 418,391

[52] U.S. Cl. ........ 340/253 A, 317/33 R, 340/248 B
[51] Int. Cl. ........................................... G08b 21/00
[58] Field of Search ...... 340/248, 253, 255; 317/31, 317/33 R; 328/148; 321/27 MS

[56] References Cited
UNITED STATES PATENTS

| | | | |
|---|---|---|---|
| 3,242,475 | 3/1966 | Davis | 340/248 C |
| 3,579,042 | 5/1971 | Abend | 317/33 R |
| 3,588,613 | 6/1971 | Losev | 317/33 R |
| 3,641,548 | 2/1972 | Groce | 340/253 A |

Primary Examiner—John W. Caldwell
Assistant Examiner—Daniel Myer
Attorney, Agent, or Firm—Ostrolenk, Faber, Gerb & Soffen

[57] ABSTRACT

In static inverters having means for monitoring the output voltage and output current, a short circuit line monitor is connected thereto and continuously monitors line voltage and line current to generate a trigger warning signal under short circuit conditions such that a current sense signal greater than a pre-set reference level occurring simultaneously with the absence of a voltage sense signal causes a trigger signal to be developed to actuate an alarm or other means. A time delay is provided to prevent the generation of a trigger signal as a result of a transient or momentary short circuit condition to prevent the generation of an erroneous alarm.

9 Claims, 2 Drawing Figures

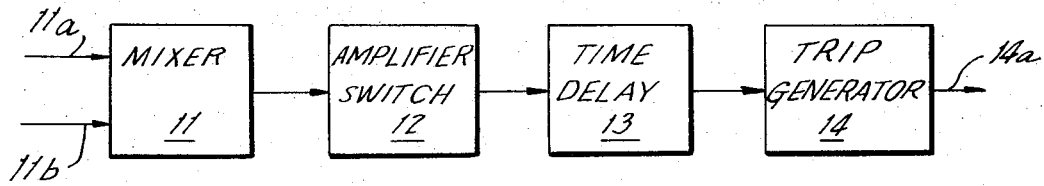
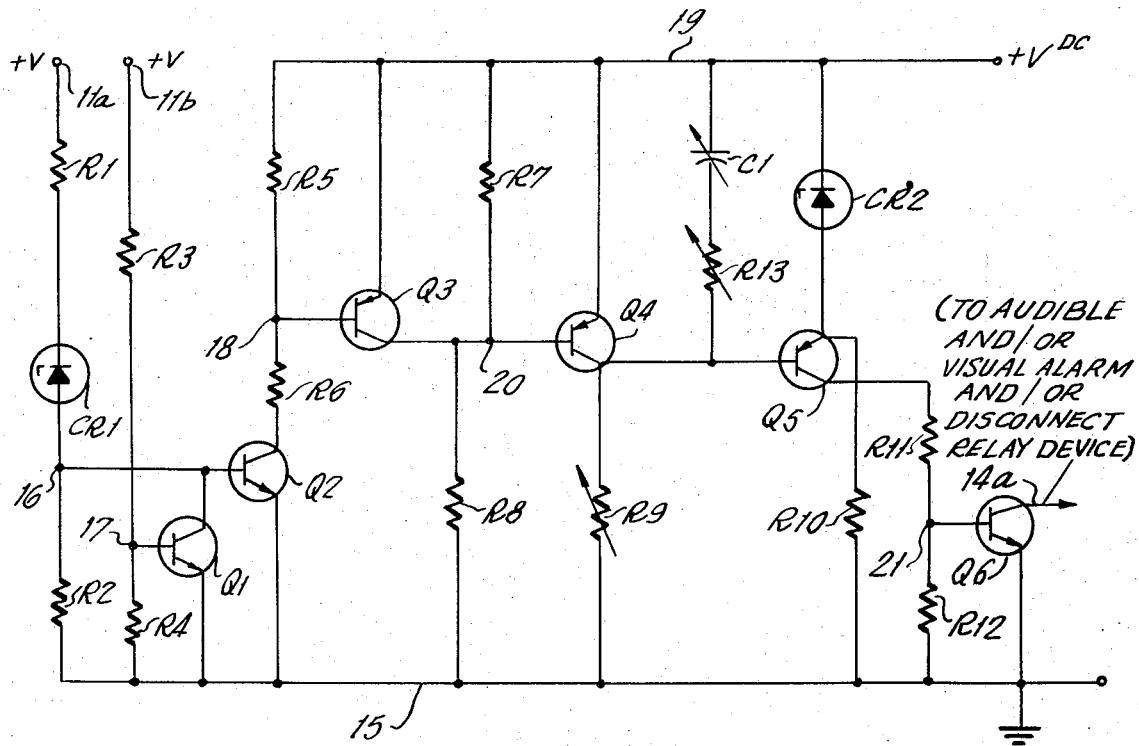

3,851,322

SHORT CIRCUIT MONITOR FOR STATIC INVERTERS AND THE LIKE

The present invention relates to static inverters and more particularly to a short circuit monitoring device for static inverters for generating an alarm condition as a result of a persistent short circuit condition in the line.

BACKGROUND OF THE INVENTION

Static inverters are typically defined as a solid state device capable of accepting a nominal DC input of a predetermined level and developing a regulated AC signal of a predetermined frequency. Static inverters of this general type are typically employed for powering instruments and other equipment aboard aircraft. One typical inverter has a total continuous rated output of 1,000 VA at any power factor between 0.8 lagging and 0.9 leading. A static inverter fitting the above definition is set forth in detail in U.S. Pat. No. 3,691,449 issued Sept. 12, 1972. The inverter described therein is comprised of solid state components capable of converting a DC input into a highly regulated AC voltage having a frequency of 400 Hz.

In order to prevent damage to the static inverter and to instrumentation and/or other equipment powered thereby it is important to provide suitable monitoring means not heretofore employed in such static inverter devices.

BRIEF DESCRIPTION OF THE INVENTION

The present invention is directed to providing a safety device for static inverters and the like which will hereinafter be referred to as a static inverter line monitor whose primary function is to alert the operator of an aircraft or other vehicle if the load on a static inverter is shorted and appropriate that action should be taken. Apparatus is provided to monitor line voltage and line current. If line current rises above a preset level and line voltage falls to zero or nearly zero, switch means are activated to initiate the charging of a timing circuit. The charging element of the timing circuit is coupled to a transistor operating as a switch and which is adapted to turn on when the charging element reaches a predetermined level after a preset delay selectable through adjustment of the parameters of the elements in the timing circuit. The switch means, in turn, activates a suitable audible and/or visual alarm to apprise the operator of a persistent short circuit condition. In instances where a short circuit condition is transient and momentary, and wherein the static inverter resumes normal operation prior to the time delay period, the time delay elements serve to prevent the generation of an erroneous short circuit condition.

BRIEF DESCRIPTION OF THE FIGURES AND OBJECTS

It is therefore one object of the present invention to provide a novel safety device for static inverters and the like which is capable of generating an alram upon the occurrence of persistent short circuit conditions.

Another object of the present invention is to provide a novel monitor circuit for use with static inverters and the like having means for monitoring output line voltage and line current to develop an alram signal when the line current exceeds a preset level and the line voltage is at or near ground level so as to develop an alarm signal if the aforementioned condition persists for a predetermined period of time.

The above as well as other objects of the present invention will become apparent when reading the accompanying description and drawing in which:

FIG. 1 shows a block diagram of a monitor circuit embodying the principles of the present invention.

FIG. 2 is a detailed schematic diagram of the monitor circuitry of FIG. 1.

DETAILED DESCRIPTION OF THE FIGURES

FIGS. 1 and 2 show a line monitor circuit 10 designed in accordance with the principles of the present invention. The simplified block diagram of FIG. 1 comprises a mixer stage 11 having two inputs 11a and 11b for respectively receiving inputs representative of line current and line voltage. The output of the mixing stage 11 is coupled to an amplifier - switch stage 12 which is normally disabled and becomes enabled when line current exceeds a predetermined threshold and the line voltage is at or near zero level.

Turn on of amplifier - switch stage 12 initiates the timing out of a time delay stage 13 whose output is coupled to a trip generator circuit 14 which is also normally disabled. Trip generator circuit 14 becomes enabled to develop an alarm signal at its output 14a so long as a short circuit condition persists for a time sufficient to enable the timing circuit to time out.

FIG. 2 shows a detailed schematic view of the short circuit line monitor of FIG. 1 and is comprised of first and second input terminals 11a and 11b for receiving signals representative of line current and line voltage respectively.

The short circuit monitor of the present invention may be utilized with any inverter adapted to provide output signals representative of line current and line voltage. One suitable static inverter is set forth in detail in the above mentioned U.S. Pat. No. 3,691,449, which inverter is incorporated herein by reference thereto. As will be noted in FIG. 1 of the aforementioned patent, current sensor 34 and voltage sensor 35 circuits are provided for developing signals representative of line current and line voltage respectively. FIG. 1a of the aforementioned U.S. Patent shows these circuits 34 and 35 in detail as comprising transformers, full-wave rectifier bridges, filter circuits and adjustable potentiometers for developing signals at the outputs of the voltage divider circuits 44 and 45 shown in FIG. 1a which may be appropriately adjusted to develop signals representative of line voltage and line current. These signals are applied to inputs 11a and 11b and are utilized as current sensing and voltage sensing signals respectively.

Input terminal 11a is coupled to a ground bus 15 through resistor R1, Zener diode CR1 and resistor R2 which are connected in series. The common terminal 16 between CR1 and R2 is coupled in common to the base of Q2 and the collector of Q1.

Input terminal 11b is coupled to a ground bus 15 through R3 and R4 connected in series and having their common terminal 17 coupled to the base of Q1. The emitters of Q1 and Q2 are directly coupled to ground bus 15.

The collector of Q2 is connected to a +VDC source through series connected resistors R6 and R5 whose common terminal 18 is connected to the Q3 base. The emitter of Q3 is directly coupled to the +VDC bus 19.

Series connected resistors R7 and R8 are coupled acress buses 19 and 15 and have their common terminal 20 connected to the Q3 collector, as well as to the base of Q4, whose emitter is directly connected to bus 19 and whose collector is connected to ground bus 15 through R9 and to the common terminal between R13 and the base of Q5. R13 is connected in series with a charging capacitor C1 whose opposite terminal is connected to bus 19.

The emitter of Q5 is connected to Zener diode CR2 whose cathode is connected to bus 19. The Q5 emitter is further coupled to ground bus 15 through resistor R10. The collector of Q5 is connected to ground bus 15 through series connected resistors R11 and R12 whose common terminal 21 is connected to the base of Q6. The output signal appearing at output terminal 14a is coupled to the collector of Q6, while the emitter is directly connected to ground bus 15.

CR1 functions as the threshold setting device for controlling the signal level at input terminal 11a required to turn on Q2 which is normally "off".

The timing circuit is comprised of series connected elements C1, R13 and R9 and the time-out of the circuit is controlled by adjusting the parameters of these elements.

Q5, which is normally off, has a threshold level set by series connected elements CR2 and R10. Resistors R11 and R12 function as a voltage divider for adjusting a threshold level for turn on of normally off transistor Q6.

The operation of the circuit of FIG. 2 is as follows:

Under normal conditions, the current sense signal is insufficient to turn on Q2 which is normally non-conducting. In addition thereto, so long as a signal of a sufficient level is applied to the voltage sense input terminal 11b, transistor Q1 will be turned on to provide an effective short circuit across the emitter and base of Q2. This short circuit condition maintains Q2 non-conducting causing the level at the base of Q3 to be the same as the level at +VDC bus 19 to maintain Q3 off. As a result, the IR drop Across R7 is sufficient to turn Q4 on to provide an effective short circuit condition between the emitter and collector of Q4 to maintain C1 in a fully discharged condition. Thus, the voltage at the base of Q5 will be at the +VDC level maintaining Q5 non-conducting. In this condition the level at common terminal 21 of the voltage divider comprised of resistors R11 and R12 is at ground potential maintaining Q6 non-conductive.

Thus when both input signals applied at terminals 11a and 11b are present, the time delay function is disabled to prevent output transistor Q6 from generating an alarm signal.

If the current sense signal is absent the circuit will still function in the same manner as described hereinabove so long as the voltage sense signal is present at a level sufficient to maintain Q1 conductive. However, if the current sense signal is greater than the reference level of CR1 and the voltage sense signal is at or near zero, i.e. is at a level insufficient to maintain Q1 conducting, Q1 will be turned off and Q2 will be enabled causing a collector current to be developed. Current will thus flow through R5 developing an IR drop sufficient to turn Q3 on to raise the level of the voltage at the Q3 collector to that of the +VDC bus 19 causing Q4 to be turned off. In the condition, the timing circuit elements C1, R13 and R9 connected across buses 19 and 15 enable C1 to begin charging at a rate determined by the parameters of C1, R13 and R9. When the level at the base of Q5 exceeds a threshold value greater than the reference level established by CR2, Q5 is rendered conductive causing collector current to be developed. This collector current develops an IR drop across R12 sufficient to turn on Q6 to develop an output collector current at 14a sufficient to drive an audible and/or visual alarm to apprise the operator of the fact that a short circuit current condition which has persisted for a period sufficient to allow time out of the timing circuit, is present. As another alternative, output terminal 14a may be coupled to a suitable switch or relay means to decouple the input DC power to the static inverter to turn off the static inverter and thereby prevent the inverter, as well as instrumentation and/or other equipment aboard the aircraft from being damaged.

It can therefore be seen that the present invention provides a novel and yet simple circuit for monitoring the output of a static inverter to develop an alarm in cases where a short circuit condition persists to apprise an operator of the potentially dangerous condition. The timing circuit (C1-R13-R9) is so arranged as to be disabled in cases where the short circuit condition is transient or momentary whereby Q4 is again rendered conductive to immediately and abruptly discharge C1 before it reaches the threshold level established by CR2.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Apparatus for monitoring the output of an inverter utilized to generate a regulated a.c. signal of a predetermined frequency, said apparatus comprising:

first and second input terminals for receiving signals respectively representing the value of line current and line voltage at the output of the inverter;

first normally non-conductive means coupled to said first input terminal and being turned on when said line current reaches a first threshold level;

second means coupled to said second input terminal for maintaining said first means in the non-conductive state when said line voltage is above a second predetermined threshold level, said second means being adapted to enable said first means to be turned on only when said line voltage falls below said second threshold level;

a source of electrical energy;

a timing circuit coupled to said energy source and adapted to charge toward a predetermined value;

switch means coupled across said timing circuit for normally providing a by-pass path to prevent charging from said energy source to be applied to said timing circuit, said switch means having an input coupled to said first means for disabling said by-pass path and enabling charging of said timing circuit when said first means is turned on;

means coupled to said timing circuit for generating an alarm signal when said timing circuit reaches a third predetermined threshold level whereby said alarm signal is generated only when circuit condition persists for a predetermined time interval.

2. The apparatus of claim 1 wherein said first means comprises a first transistor having base, emitter and collector electrodes, and a zener diode coupled between said first input terminal and the emitter of said first transistor.

3. The apparatus of claim 2 wherein said second means comprises a second transistor having base, emitter and collector electrodes;
the collector and base of said second transistor being respectively coupled to the base of said first transistor and said input terminal.

4. The apparatus of claim 3 wherein said timing circuit comprises a capacitor coupled to said energy source;
said switch means comprising a third transistor having its collector and emitter coupled across the capacitor.

5. The apparatus of claim 4 wherein said alarm means comprises a fourth transistor having its base coupled to said capacitor and having a zener diode means coupled to its emitter.

6. The apparatus of claim 5 wherein said alarm means further comprises a fifth transistor; voltage divider means coupled between the collector of said fourth transistor and the base of said fifth transistor, said alarm signal being developed across the emitter and collector of said fifth transistor.

7. The apparatus of claim 6 further comprising means for developing an audible alarm coupled to said fifth transistor.

8. The apparatus of claim 6 further comprising means for developing a visual alarm coupled to said fifth transistor.

9. The apparatus of claim 6 further comprising means for developing an alarm coupled to said fifth transistor, said means further comprising means for deactivating said inverter.

* * * * *